(12) United States Patent
Yang et al.

(10) Patent No.: US 12,586,267 B2
(45) Date of Patent: Mar. 24, 2026

(54) INTERACTION METHOD AND APPARATUS IN LIVE STREAMING ROOM, DEVICE, AND STORAGE MEDIUM

(71) Applicant: BEIJING ZITIAO NETWORK TECHNOLOGY CO., LTD., Beijing (CN)

(72) Inventors: Ling Yang, Beijing (CN); Manting Wang, Beijing (CN); Sijing Wang, Beijing (CN); Ji Liu, Beijing (CN); Feifei Tang, Beijing (CN); Xiaoben Wang, Beijing (CN); Man Zhang, Beijing (CN); Zaiyou Ruan, Beijing (CN); Yuna Hu, Beijing (CN); Zihao Chen, Beijing (CN); Siqin Liu, Beijing (CN); Chen Zhong, Beijing (CN); Suyao Zhang, Beijing (CN); Yichao Wu, Beijing (CN); Changhua He, Beijing (CN); Zenan Li, Beijing (CN); Yibin Chen, Beijing (CN); Jialuo Zhang, Beijing (CN); Ping Li, Beijing (CN); Xinyue Gong, Beijing (CN); Jialong Zhao, Beijing (CN); Fanglu Zhong, Beijing (CN); Lin Zhou, Beijing (CN); Fukang Hong, Beijing (CN); Xiangzeng Meng, Beijing (CN); Qian Li, Beijing (CN)

( * ) Notice: Subject to any disclaimer, the term of this patent is extended or adjusted under 35 U.S.C. 154(b) by 181 days.

(21) Appl. No.: 18/550,590

(22) PCT Filed: Mar. 14, 2022

(86) PCT No.: PCT/CN2022/080543
§ 371 (c)(1),
(2) Date: Sep. 14, 2023

(87) PCT Pub. No.: WO2022/194065
PCT Pub. Date: Sep. 22, 2022

(65) Prior Publication Data
US 2024/0153168 A1     May 9, 2024

(30) Foreign Application Priority Data
Mar. 15, 2021     (CN) .......................... 202110276632.0

(51) Int. Cl.
*G06T 11/20* (2006.01)
*H04N 21/2187* (2011.01)
*H04N 21/431* (2011.01)

(52) U.S. Cl.
CPC ....... *G06T 11/203* (2013.01); *H04N 21/2187* (2013.01); *H04N 21/4312* (2013.01)

(58) Field of Classification Search
None
See application file for complete search history.

(56) References Cited

U.S. PATENT DOCUMENTS

2016/0249108 A1* 8/2016 Sexton ............... H04N 21/4622
2016/0373693 A1* 12/2016 Segal ..................... H04N 21/47
(Continued)

FOREIGN PATENT DOCUMENTS

CN     109547836 A     3/2019
CN     110703913 A     1/2020
(Continued)

OTHER PUBLICATIONS

ECAPYC (One Touch Drawing, https://www.youtube.com/watch?v=AVpLM-O5k60, Mar. 25, 2012 (Year: 2012).*
(Continued)

*Primary Examiner* — Jeffrey J Chow
(74) *Attorney, Agent, or Firm* — Fish & Richardson P.C.

(57)     ABSTRACT

Provided are an interaction method and apparatus in a live streaming room, a device, and a storage medium. The
(Continued)

method comprises: in response to a trigger operation for a preset drawing entry on a live streaming room page, jumping to a graphic drawing page from the live streaming room page, a drawing trajectory set for a preset object being displayed on the graphical drawing page; when a drawing stroke on the graphic drawing page is received, matching the drawing stroke with the drawing trajectory; and if it is determined that the drawing stroke is successfully matched with the drawing trajectory, displaying prompt information about successful participation in a preset activity, the preset activity and the preset drawing entry having a correspondence.

20 Claims, 12 Drawing Sheets

(56) References Cited

U.S. PATENT DOCUMENTS

| | | | |
|---|---|---|---|
| 2020/0338456 A1 * | 10/2020 | Atli | A63F 13/79 |
| 2022/0312065 A1 | 9/2022 | Han et al. | |
| 2025/0088700 A1 * | 3/2025 | Yang | H04N 21/431 |

FOREIGN PATENT DOCUMENTS

| | | | |
|---|---|---|---|
| CN | 112261459 | A | 1/2021 |
| CN | 112308582 | A | 2/2021 |
| CN | 112346634 | A | 2/2021 |
| CN | 113253901 | A | 8/2021 |
| JP | 2015191325 | A | 11/2015 |
| WO | 2019/072096 | A1 | 4/2019 |

OTHER PUBLICATIONS

Ladylive (Ladylive Jiejie Lai Zhi Bo) "(Non-official translation: Detailed Explanation of Luck Draw Function in Live Streaming)", Zhihu, [online], [search date: May 9, 2022]. search from: <URL:https://zhuanlan.zhihu.com/p/347845404>, Jan. 29, 2021.

International Search Report and Written Opinion, International Patent Application No. PCT/CN2022/080543, May 26, 2023, with English translation of Search Report (13 pages).

* cited by examiner

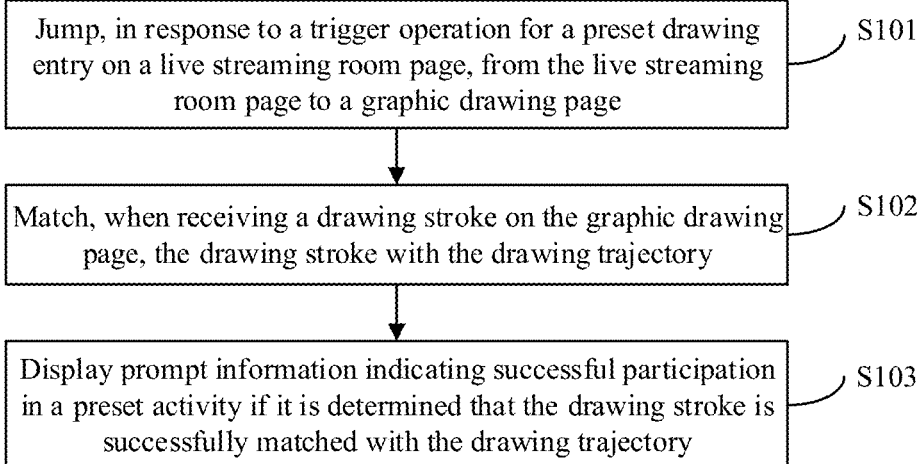

| Jump, in response to a trigger operation for a preset drawing entry on a live streaming room page, from the live streaming room page to a graphic drawing page | S101 |

| Match, when receiving a drawing stroke on the graphic drawing page, the drawing stroke with the drawing trajectory | S102 |

| Display prompt information indicating successful participation in a preset activity if it is determined that the drawing stroke is successfully matched with the drawing trajectory | S103 |

Figure 1

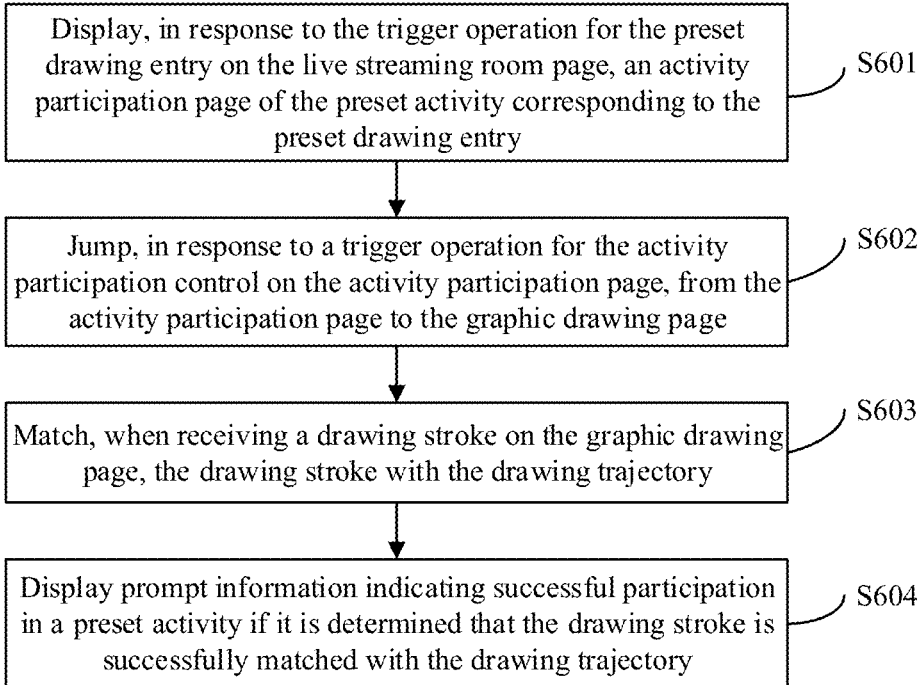

| Display, in response to the trigger operation for the preset drawing entry on the live streaming room page, an activity participation page of the preset activity corresponding to the preset drawing entry | S601 |

| Jump, in response to a trigger operation for the activity participation control on the activity participation page, from the activity participation page to the graphic drawing page | S602 |

| Match, when receiving a drawing stroke on the graphic drawing page, the drawing stroke with the drawing trajectory | S603 |

| Display prompt information indicating successful participation in a preset activity if it is determined that the drawing stroke is successfully matched with the drawing trajectory | S604 |

Figure 6

INTERACTION METHOD AND APPARATUS IN LIVE STREAMING ROOM, DEVICE, AND STORAGE MEDIUM

This application is the national phase of International Patent Application No. PCT/CN2022/080543 filed on Mar. 14, 2022, which claims priority to Chinese Patent Application No. 202110276632.0, titled "INTERACTION METHOD AND APPARATUS IN LIVE STREAMING ROOM, DEVICE, AND STORAGE MEDIUM", filed on Mar. 15, 2021 with the China National Intellectual Property Administration, both of which are incorporated herein by reference in their entireties.

FIELD

The present disclosure relates to the field of data processing, and in particular to an interaction method and an interaction apparatus in a live streaming room, a device and a storage medium.

BACKGROUND

With the development of network technology, watching live streaming has gradually become one of the ways for people to entertain themselves. At present, interaction functions in the live streaming room are relatively simple. How to enrich the interaction functions in the live streaming room so as to attract users to stay in the live streaming room is a technical problem that is continuously explored in the current live streaming field.

SUMMARY

In order to solve the above technical problems or at least partly solve the above technical problems, an interaction method and an interaction apparatus in a live streaming room, a device and a storage medium are provided in the present disclosure. A drawing function is provided in the live streaming room, and participation in a preset activity is triggered by a drawing stroke, thereby enriching the interaction functions in the live streaming room and improving the user experience in the live streaming room.

In a first aspect, an interaction method in a live streaming room is provided according to the disclosure. The method includes: jumping, in response to a trigger operation for a preset drawing entry on a live streaming room page, from the live streaming room page to a graphic drawing page, where the graphic drawing page displays a drawing trajectory set for a preset object; matching, when receiving a drawing stroke on the graphic drawing page, the drawing stroke with the drawing trajectory; and displaying prompt information indicating successful participation in a preset activity if it is determined that the drawing stroke is successfully matched with the drawing trajectory, where the preset activity is in a correspondence with the preset drawing entry.

In an optional embodiment, the jumping, in response to a trigger operation for a preset drawing entry on a live streaming room page, from the live streaming room page to a graphic drawing page includes: displaying, in response to the trigger operation for the preset drawing entry on the live streaming room page, an activity participation page of the preset activity corresponding to the preset drawing entry, where an activity participation control is provided on the activity participation page; and jumping, in response to a trigger operation for the activity participation control on the activity participation page, from the activity participation page to the graphic drawing page.

In an optional embodiment, the preset activity is configured with a countdown used for counting down a time period available for participation in the preset activity, before matching the drawing stroke with the drawing trajectory, the method further includes: determining, when receiving the drawing stroke on the graphic drawing page, whether the countdown is over; and the matching the drawing stroke with the drawing trajectory includes: matching the drawing stroke with the drawing trajectory if it is determined that the countdown is not over.

In an optional embodiment, after determining, when receiving the drawing stroke on the graphic drawing page, whether the countdown is over, the method further includes: displaying prompt information indicating failure of participating in the preset activity if it is determined that the countdown is over.

In an optional embodiment, a drawing guidance animation is played on the graphic drawing page, and the drawing guidance animation is used for guiding a user to draw based on the drawing trajectory.

In an optional embodiment, after matching the drawing stroke with the drawing trajectory, the method further includes: playing the drawing guidance animation on the graphic drawing page and displaying redrawing prompt information if it is determined that the drawing stroke fails to match the drawing trajectory.

In an optional embodiment, the preset activity is configured with a preset participation condition, before displaying the activity participation page of the preset activity corresponding to the preset drawing entry, the method further includes: determining, in response to the trigger operation for the preset drawing entry on the live streaming room page, whether a current user meets the preset participation condition, and the displaying an activity participation page of the preset activity corresponding to the preset drawing entry includes: displaying the activity participation page of the preset activity corresponding to the preset drawing entry if it is determined that the current user meets the preset participation condition.

In an optional embodiment, after displaying the prompt information indicating successful participation in the preset activity, the method further includes: displaying, in response to a message of winning an activity object of the preset activity, a mailing information filling page, where a mailing information submission control is provided on the mailing information filling page; and acquiring, in response to a trigger operation for the mailing information submission control, mailing information filled on the mailing information filling page, where the mailing information is used for mailing the activity object.

In a second aspect, an interaction apparatus in a live streaming room is provided according to the disclosure. The apparatus includes: a first jumping module configured to jump, in response to a trigger operation for a preset drawing entry on a live streaming room page, from the live streaming room page to a graphic drawing page, where the graphic drawing page displays a drawing trajectory set for a preset object; a matching module configured to match, when receiving a drawing stroke on the graphic drawing page, the drawing stroke with the drawing trajectory; and a first displaying module configured to display prompt information indicating successful participation in a preset activity if it is determined that the drawing stroke is successfully matched with the drawing trajectory, where the preset activity is in a correspondence with the preset drawing entry.

In a third aspect, a computer-readable storage medium is provided according to the disclosure. The computer-readable storage medium stores instructions. The instructions, when being executed in a terminal device, cause the terminal device to perform the method described above.

In a fourth aspect, a device is provided according to the disclosure. The device includes a memory, a processor, and computer programs which are stored in the memory and operable on the processor. The processor, when executing the computer programs, performs the method described above.

In a fifth aspect, a computer program product is provided according to the disclosure. The computer program product includes computer programs/instructions. The computer programs/instructions, when being executed by a processor, cause the processor to perform the method described above.

Compared with the conventional art, the technical solutions provided by the embodiments of the present disclosure have the following advantages. An interaction method in a live streaming room is provided according to an embodiment of the present disclosure. In response to a trigger operation for a preset drawing entry on a live streaming room page, a jump from the live streaming room page to a graphic drawing page is implemented, where the graphic drawing page displays a drawing trajectory set for a preset object. When receiving a drawing stroke on the graphic drawing page, the drawing stroke is matched with the drawing trajectory. Prompt information indicating successful participation in a preset activity is displayed if it is determined that the drawing stroke is successfully matched with the drawing trajectory, where the preset activity is in a correspondence with the preset drawing entry. In the embodiments of the present disclosure, the drawing function is provided in the live streaming room, and participation in the preset activity is triggered by the drawing stroke, thereby enriching the interaction functions in the live streaming room and improving the user experience in the live streaming room.

BRIEF DESCRIPTION OF THE DRAWINGS

The accompanying drawings, which are incorporated in the specification and constitute a part of the specification, illustrate embodiments of the present disclosure and together with the description serve to explain the principles of the present disclosure.

In order to more clearly explain the embodiments of the present disclosure or the technical solutions in the conventional art, the drawings used in the description of the embodiments or the conventional art are briefly introduced below. Apparently, for those skilled in the art, other drawings may be obtained according to the provided drawings without any creative effort.

FIG. 1 is a flow chart of an interaction method in a live streaming room according to an embodiment of the present disclosure;

FIG. 6 is a flow chart of an interaction method in a live streaming room according to another embodiment of the present disclosure;

DETAILED DESCRIPTION OF EMBODIMENTS

Figure 2:
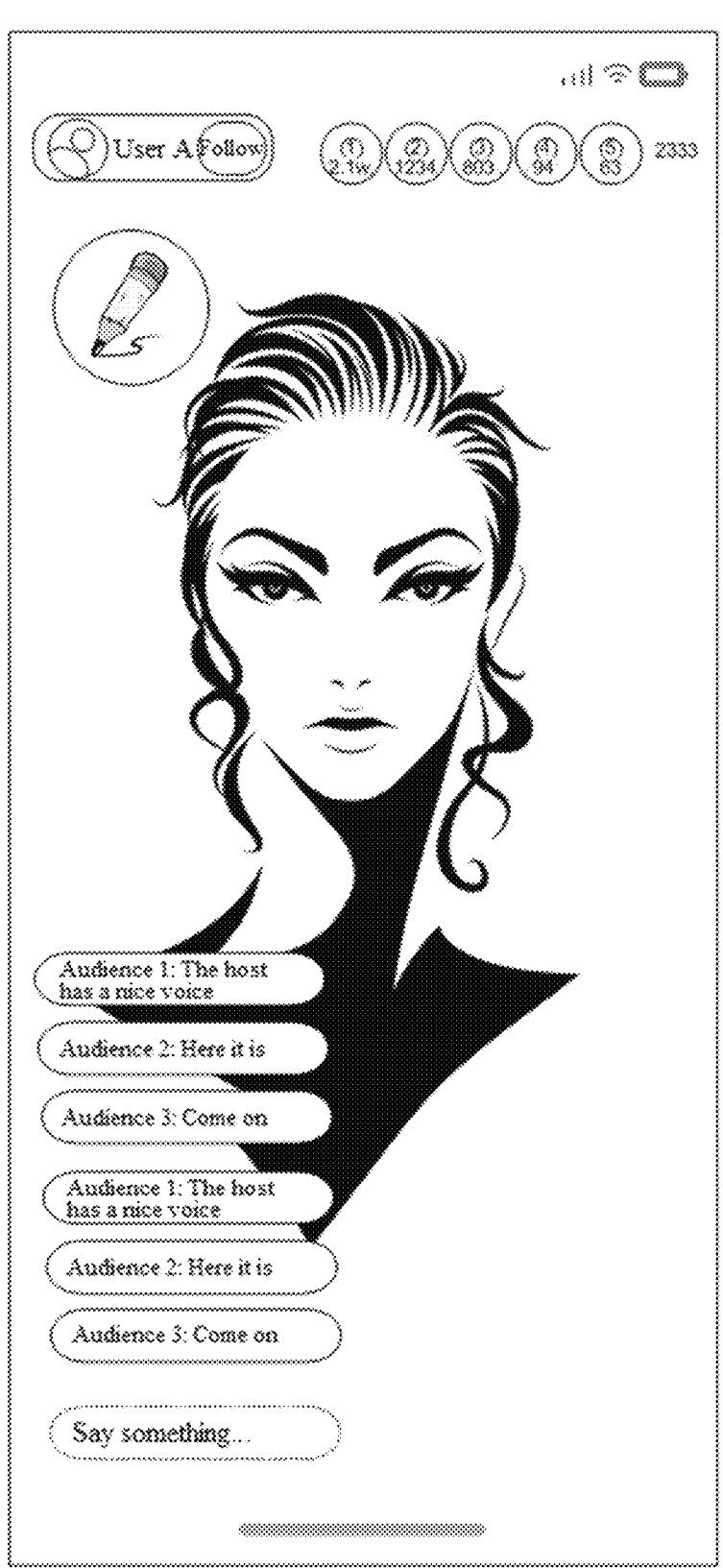
FIG. 2 is a schematic diagram of a live streaming room page according to an embodiment of the present disclosure.

In order to more clearly understand the above objects, features and advantages of the present disclosure, the solutions of the present disclosure will be further described below. It should be noted that, in the case of no conflict, the embodiments of the present disclosure and the features in the embodiments may be combined with each other.

In the following description, many specific details are set forth in order to fully understand the present disclosure, however the present disclosure may also be implemented in other ways than those described herein. Apparently, the embodiments in the specification are only some of, rather than all, embodiments of the present disclosure.

With the development of the live streaming technology, users have more and more requirements for interaction functions in the live streaming room. How to enrich the interaction functions in the live streaming room to meet the requirements of users is a technical problem that is continuously explored in the current live streaming field.

An interaction method in a live streaming room is provided according to an embodiment of the present disclosure. In response to a trigger operation for a preset drawing entry on a live streaming room page, a jump from the live streaming room page to a graphic drawing page is implemented, where the graphic drawing page displays a drawing trajectory set for a preset object. When receiving a drawing stroke on the graphic drawing page, the drawing stroke is matched with the drawing trajectory. Prompt information indicating successful participation in a preset activity is displayed if it is determined that the drawing stroke is successfully matched with the drawing trajectory, where the preset activity is in a correspondence with the preset drawing entry.

It can be seen that, in the embodiments of the present disclosure, the drawing function is provided in the live streaming room, and participation in the preset activity is triggered by the drawing stroke, thereby enriching the interaction functions in the live streaming room, enlivening the atmosphere in the live streaming room, and improving the user experience in the live streaming room.

Based on this, an interaction method in a live streaming room is provided according to an embodiment of the present disclosure. Referring to FIG. 1, FIG. 1 is a flow chart of an interaction method in a live streaming room according to an embodiment of the present disclosure. The method includes S101 to S103.

S101, jump, in response to a trigger operation for a preset drawing entry on a live streaming room page, from the live streaming room page to a graphic drawing page.

The graphic drawing page displays a drawing trajectory set for a preset object.

In the embodiment of the present disclosure, after a user enters a live streaming room, during the process of watching the live streaming, the preset drawing entry may be displayed on the live streaming room page. The preset drawing entry may be in the form of an animation or in the form of an image. As shown in FIG. 2, FIG. 2 is a schematic diagram of a live streaming room page according to an embodiment of the present disclosure. The preset drawing entry is displayed on the upper left corner of the live streaming room page, and the user may trigger a corresponding drawing function by clicking the preset drawing entry.

Figure 3:
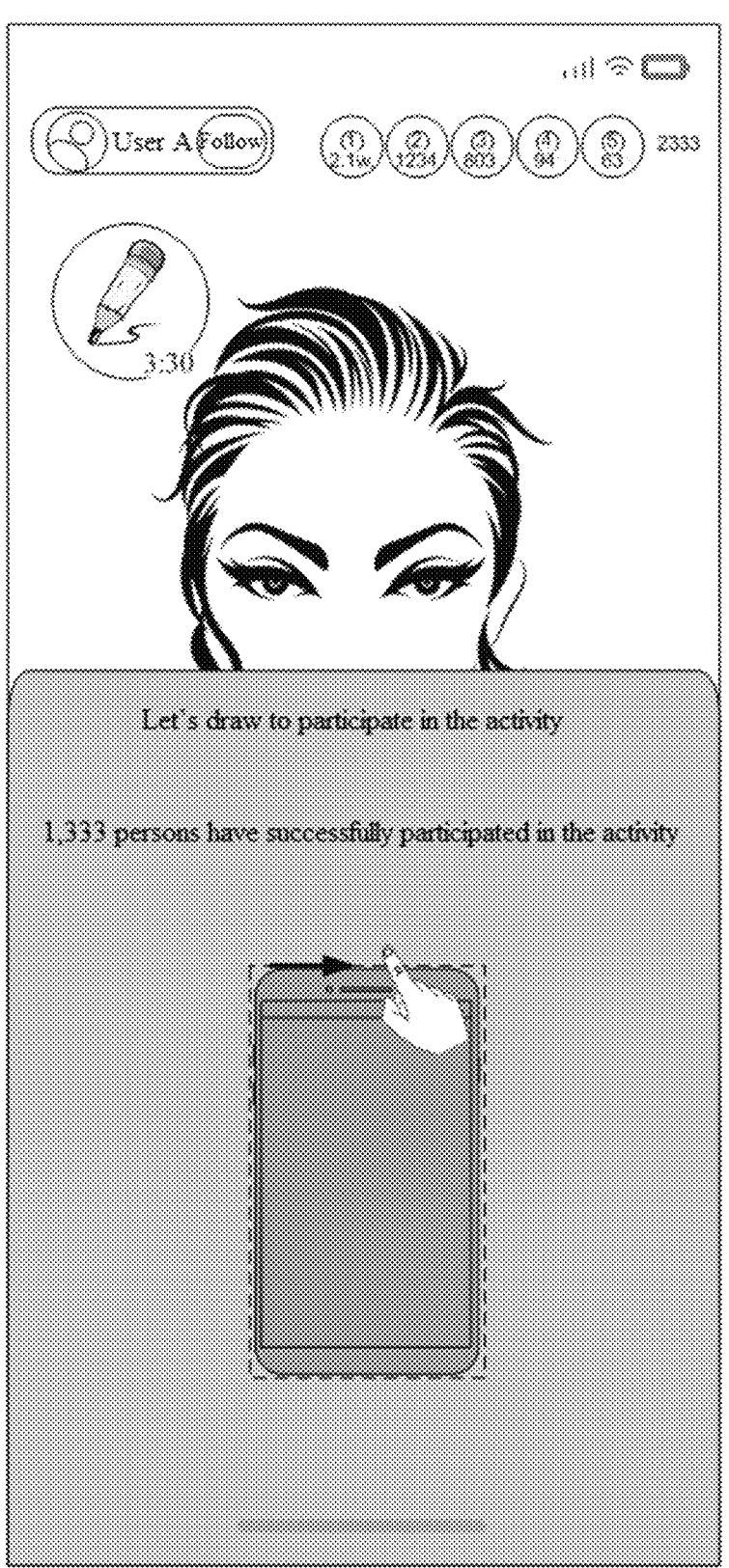
FIG. 3 is a schematic diagram of a graphic drawing page according to an embodiment of the present disclosure.

In practice, when the trigger operation for the preset drawing entry on the live streaming room page is received, a jump from the live streaming room page to the graphic drawing page is implemented. As shown in FIG. 3, FIG. 3 is a schematic diagram of a graphic drawing page according to an embodiment of the present disclosure. The drawing trajectory for the preset object is displayed on the graphic drawing page, such as the rectangular dotted line box in FIG. 3. Alternatively, the drawing trajectory for the preset object may be in the form of numbers, letters, and the like. Specifically, the drawing trajectory shown in FIG. 3 is a drawing trajectory for a mobile phone of a certain brand. In addition, the preset object may be an activity object in the preset activity which is in a correspondence with the preset drawing entry, such as a mobile phone of a certain brand.

In an optional embodiment, a drawing guidance animation is played on the graphic drawing page, as shown in FIG. 3. Specifically, the drawing guidance animation is used for guiding the user to draw based on the drawing trajectory.

S102, match, when receiving a drawing stroke on the graphic drawing page, the drawing stroke with the drawing trajectory.

Figure 4:
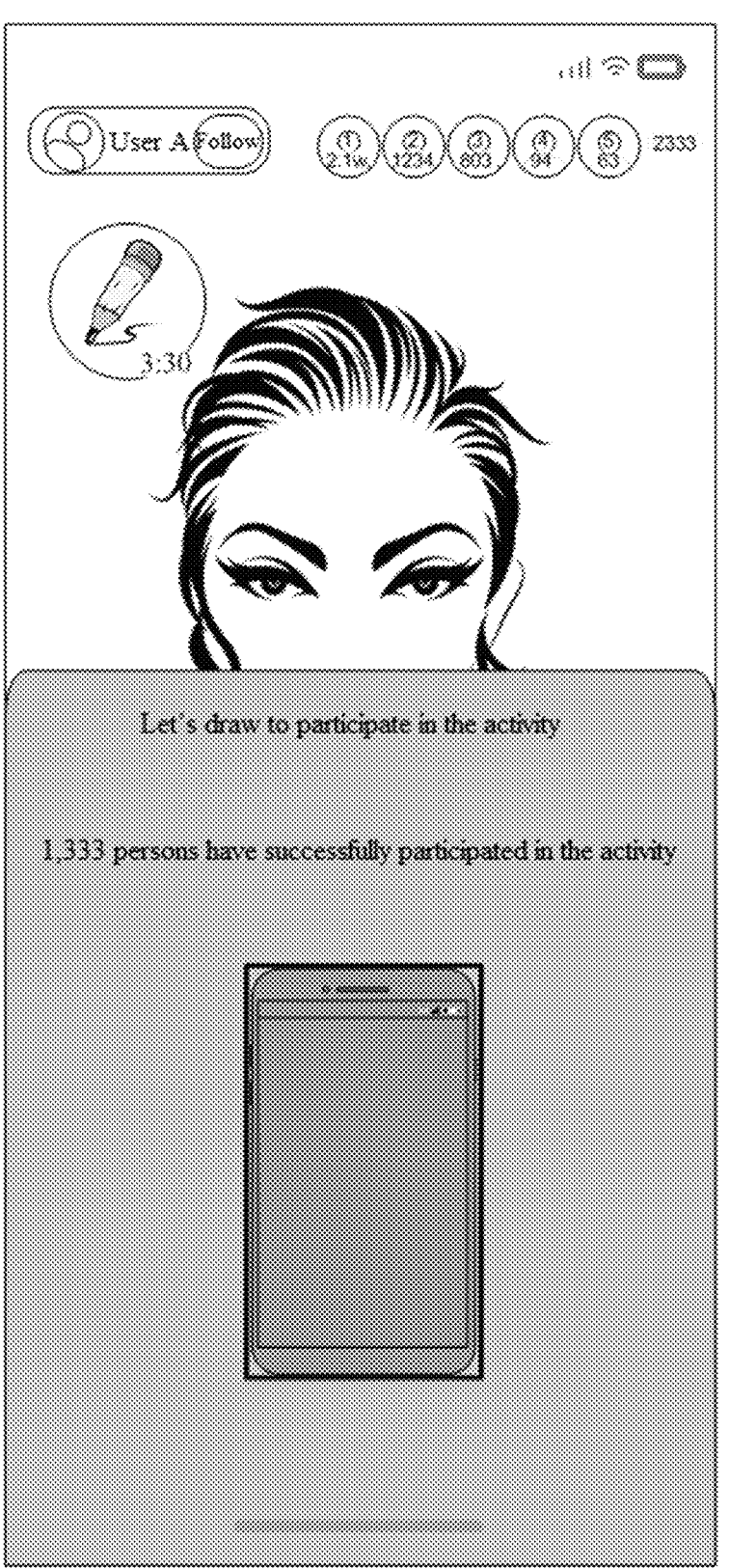
FIG. 4 is a schematic diagram of a graphic drawing page with a drawing stroke according to an embodiment of the present disclosure.

In the embodiment of the present disclosure, the user may draw the stroke on the graphic drawing page based on the drawing trajectory displayed on the graphic drawing page. Specifically, after the user's finger contact starts to draw, once it is detected that the user's finger contact leaves the touch screen (that is, the finger is lifted), the drawing stroke on the graphic drawing page are acquired. As shown in FIG. 4, FIG. 4 is a schematic diagram of a graphic drawing page with a drawing stroke according to an embodiment of the present disclosure. The drawing stroke refers to the drawing trajectory generated during a period from a time point when the user's finger contact starts to draw to a time point when the user's finger contact leaves the touch screen for the first time. For example, the solid line rectangle box shown in FIG. 4 is a drawing stroke.

In the embodiment of the present disclosure, when the drawing stroke on the graphic drawing page is acquired, the drawing stroke is matched (compared) with the drawing trajectory displayed on the graphic drawing page. In an optional embodiment, when it is determined that there is 80% overlapped trajectory between the drawing stroke and the drawing trajectory displayed on the graphic drawing page, it may be determined that the drawing stroke matches the drawing trajectory successfully. Other matching manners are not limited in the embodiment of the present disclosure.

S103, display prompt information indicating successful participation in a preset activity if it is determined that the drawing stroke is successfully matched with the drawing trajectory, where the preset activity is in a correspondence with the preset drawing entry.

Figure 5:
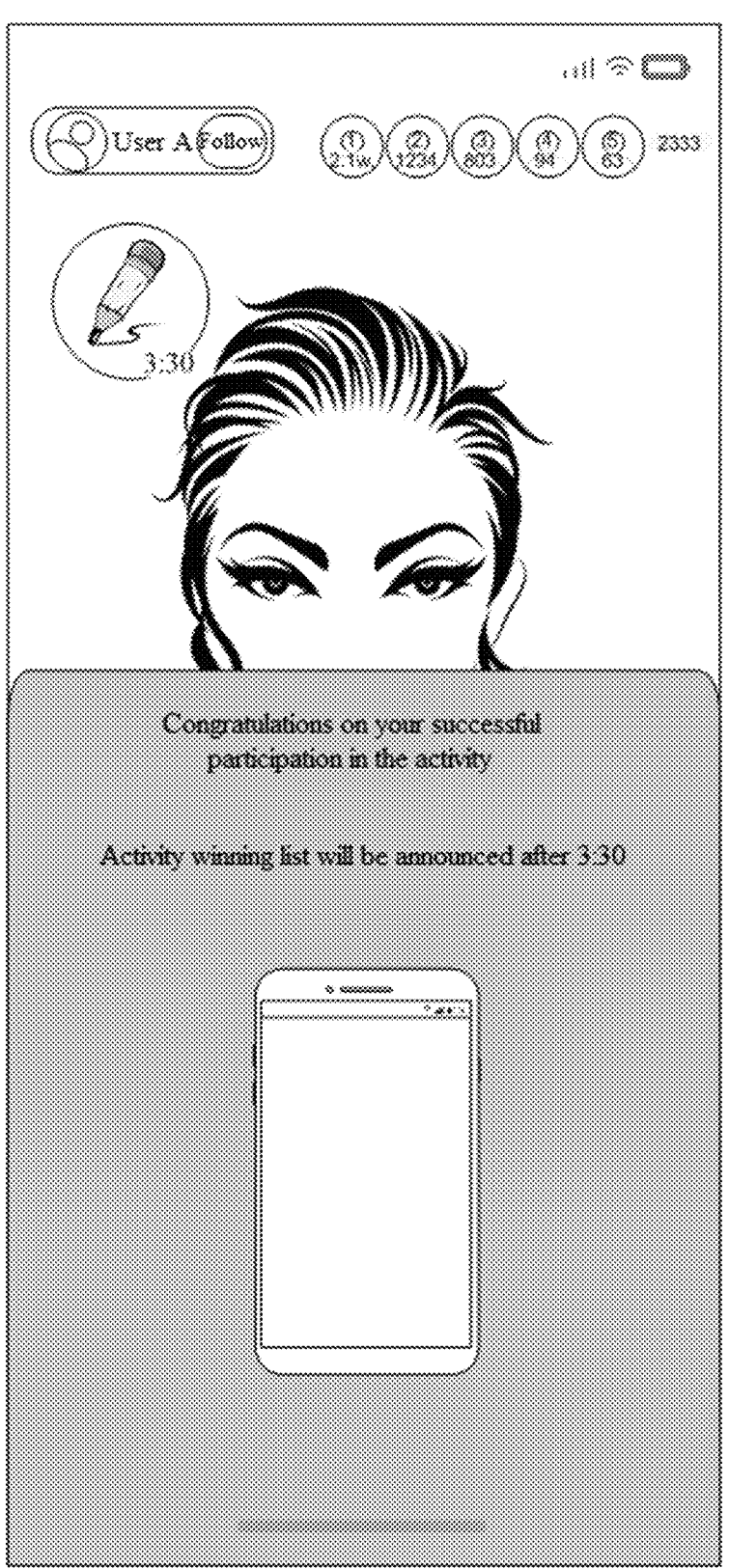
FIG. 5 is a schematic diagram of a display page of prompt information according to an embodiment of the present disclosure.

In the embodiment of the present disclosure, the prompt information indicating successful participation in the preset activity is displayed if it is determined that the drawing stroke is successfully matched with the drawing trajectory. As shown in FIG. 5, FIG. 5 is a schematic diagram of a display page of prompt information according to an embodiment of the present disclosure. In addition, a real object corresponding to the preset activity, such as a mobile phone of a certain brand as shown in FIG. 5, may also be displayed on the display page of the prompt information.

In the embodiment of the present disclosure, the correspondence between the preset activity and the preset drawing entry displayed on the live streaming room page is preset, so that the successful participation in the preset activity is realized by a drawing interaction function corresponding to the preset drawing entry, thereby enriching interaction ways for participation in the activity in the live streaming room.

In the interaction method in the live streaming room according to an embodiment of the present disclosure, in response to a trigger operation for a preset drawing entry on a live streaming room page, a jump from the live streaming room page to a graphic drawing page is implemented, where the graphic drawing page displays a drawing trajectory set for a preset object. When receiving a drawing stroke on the graphic drawing page, the drawing stroke is matched with the drawing trajectory. Prompt information indicating successful participation in a preset activity is displayed if it is determined that the drawing stroke is successfully matched with the drawing trajectory, where the preset activity is in a correspondence with the preset drawing entry. In the embodiments of the present disclosure, the drawing function is provided in the live streaming room, and participation in the preset activity is triggered by the drawing stroke, thereby enriching the interaction functions in the live streaming room and improving the user experience in the live streaming room.

On the basis of the above embodiment, the present disclosure further provides a scene example of an interaction method in a live streaming room. As shown in FIG. 6, FIG. 6 is a flow chart of an interaction method in a live streaming room according to another embodiment of the present disclosure. The method includes S601 to S604.

S601, display, in response to the trigger operation for the preset drawing entry on the live streaming room page, an activity participation page of the preset activity corresponding to the preset drawing entry.

An activity participation control is provided on the activity participation page.

In the embodiment of the present disclosure, the preset drawing entry is displayed on the live streaming room page. As shown in FIG. 2, the preset drawing entry may be an entry configured for a preset activity. For example, the preset activity may be lucky draw, receiving red envelopes, receiving virtual items such as coupons.

In an optional embodiment, before displaying the preset drawing entry on the live streaming room page, an effect animation may be played to remind the user that the activity is about to start. Specifically, the effect animation may be a countdown 3, 2, 1 animation, or other types of effect animation, which is not limited here. After the effect animation is played, the preset drawing entry is displayed on the live streaming room page, and the user may click the preset drawing entry to enter the activity participation page.

In addition, in the embodiment of the present disclosure, the preset activity may be configured with a preset participation condition. For example, the preset participation condition may be that the current user has joined the fan club of the host of the live streaming room, and the like. When the trigger operation for the preset drawing entry on the live streaming room page is received, it is firstly determined whether the current user meets the preset participation condition. The activity participation page is entered if the current user meets the preset participation condition. Prompt information indicating that the current user does not meet the preset participation condition is displayed if the current user does not meet the preset participation condition. The preset participation condition may be configured based on activity requirements, which is not limited here.

In practice, when the trigger operation for the preset drawing entry on the live streaming room page is received, a jump from the live streaming room page to the activity participation page of the preset activity corresponding to the preset drawing entry is implemented. The activity participation control is provided on the activity participation page, in addition, activity introduction information and the like may also be displayed on the activity participation page.

Figure 7:
FIG. 7 is a schematic diagram of an activity participation page according to an embodiment of the present disclosure.

As shown in FIG. 7, FIG. 7 is a schematic diagram of an activity participation page according to an embodiment of the present disclosure. Activity introduction information such as activity reward items, quantity, and activity participation conditions are displayed on the activity participation page. In addition, the activity participation page is also provided with an activity participation control "one-click participation in drawing".

In an optional embodiment, the activity participation page may be a half-screen page displayed above the live streaming room page, as shown in FIG. 7, the half-screen page may be dragged up and down to view content not displayed.

S602, jump, in response to a trigger operation for the activity participation control on the activity participation page, from the activity participation page to the graphic drawing page.

In the embodiment of the present disclosure, when the trigger operation for the activity participation control on the activity participation page is received, a jump from the activity participation page to the graphic drawing page is implemented. For example, when the user clicks the activity participation control "one-click participation in drawing" in FIG. 7, a jump from the activity participation page to the graphic drawing page shown in FIG. 3 is implemented.

In an optional embodiment, a payment condition may be configured for the preset activity corresponding to the activity participation page, for example, 1 virtual currency needs to be paid to participate in this activity. In this case, when the trigger operation for the activity participation control on the activity participation page is received, a virtual currency payment function may be called first, and a window for the user to determine whether to pay the virtual currency pops up. If the user performs the payment and the payment is successful, a jump to the graphic drawing page is implemented. If there is not a successful payment, a window for indicating that the user fails to participate in the activity pops up.

In the embodiment of the present disclosure, the drawing trajectory set for the preset object is displayed on the graphic drawing page, and the user can draw the stroke on the graphic drawing page based on the drawing trajectory, as shown in FIG. 3. Specifically, the description for the graphic drawing page may be understood with reference to the above-mentioned embodiments, and details are not repeated here.

S603, match, when receiving a drawing stroke on the graphic drawing page, the drawing stroke with the drawing trajectory.

S603 in the embodiment of the present disclosure is implemented in the same manner as S102 in the foregoing embodiment, and may be understood by referring to the description of S102 in the foregoing embodiment, and details are not repeated here.

In an optional embodiment, the preset activity may be configured with a countdown in advance. The countdown is used for counting down a time period available for participation in the preset activity. Specifically, when receiving the drawing stroke on the graphic drawing page, it is determined whether the countdown is over. The drawing stroke is matched with the drawing trajectory if it is determined that the countdown is not over. Prompt information indicating failure of participating in the preset activity is displayed if it is determined that the countdown is over.

S604, display prompt information indicating successful participation in a preset activity if it is determined that the drawing stroke is successfully matched with the drawing trajectory, where the preset activity is in a correspondence with the preset drawing entry.

Figure 8:
FIG. 8 is a schematic diagram of a display page of redrawing prompt information according to an embodiment of the present disclosure.

In the embodiment of the present disclosure, the prompt information indicating successful participation in the preset activity is displayed if it is determined that the drawing stroke is successfully matched with the drawing trajectory, as shown in FIG. 5. The drawing guidance animation may be played on the graphic drawing page and redrawing prompt information may be displayed if it is determined that the drawing stroke fails to match the drawing trajectory, as shown in FIG. 8.

In the embodiments of the present disclosure, the drawing function is provided in the live streaming room, and participation in the preset activity is triggered by the drawing stroke, thereby enriching the interaction functions in the live streaming room and improving the user experience in the live streaming room.

On the basis of the above-mentioned embodiments, if it is determined that the drawing stroke is successfully matched with the drawing trajectory, when receiving a message of winning an activity object of the preset activity, mailing information of the activity object may be collected online, so as to realize the online closed loop of this activity.

In an optional embodiment, a mailing information filling page is displayed in response to a message of winning an activity object of the preset activity. A mailing information submission control is provided on the mailing information filling page. Mailing information filled on the mailing information filling page is acquired in response to a trigger operation for the mailing information submission control. The mailing information is used for mailing the activity object.

Figure 9:
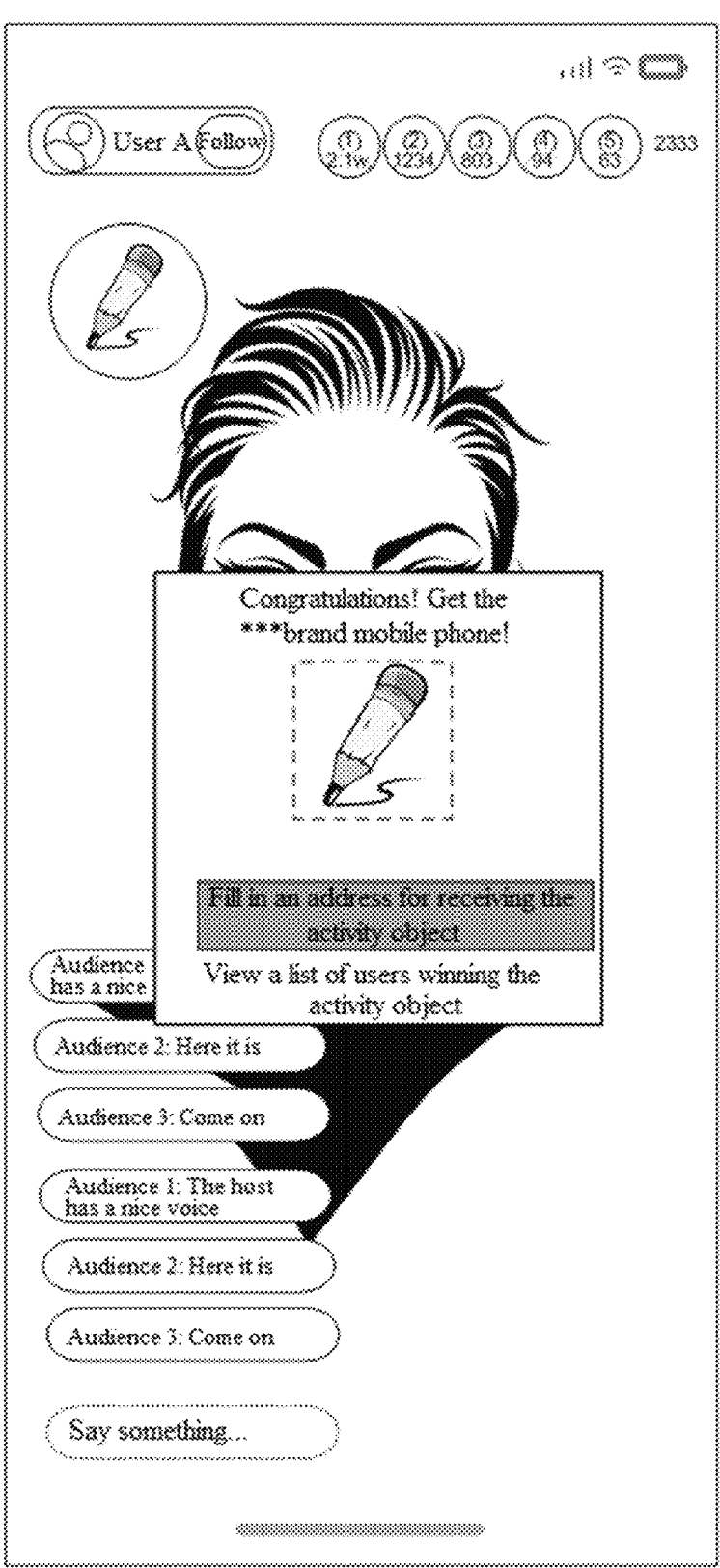
FIG. 9 is a schematic diagram of an activity object winning prompt window according to an embodiment of the present disclosure.

In practice, an activity object winning prompt window may be displayed on the live streaming room page when receiving the message of winning the activity object of the preset activity. The activity object winning prompt window is provided with an activity object receiving entry. Usually, the activity object may be a real object. As shown in FIG. 9, FIG. 9 is a schematic diagram of an activity object winning prompt window according to an embodiment of the present disclosure.

When the user clicks a mailing information filling entry on the activity object winning prompt window, the mailing information filling page may be displayed, so that the user can fill in the mailing information of the activity object and realize the online closed loop of the activity.

Figure 10:
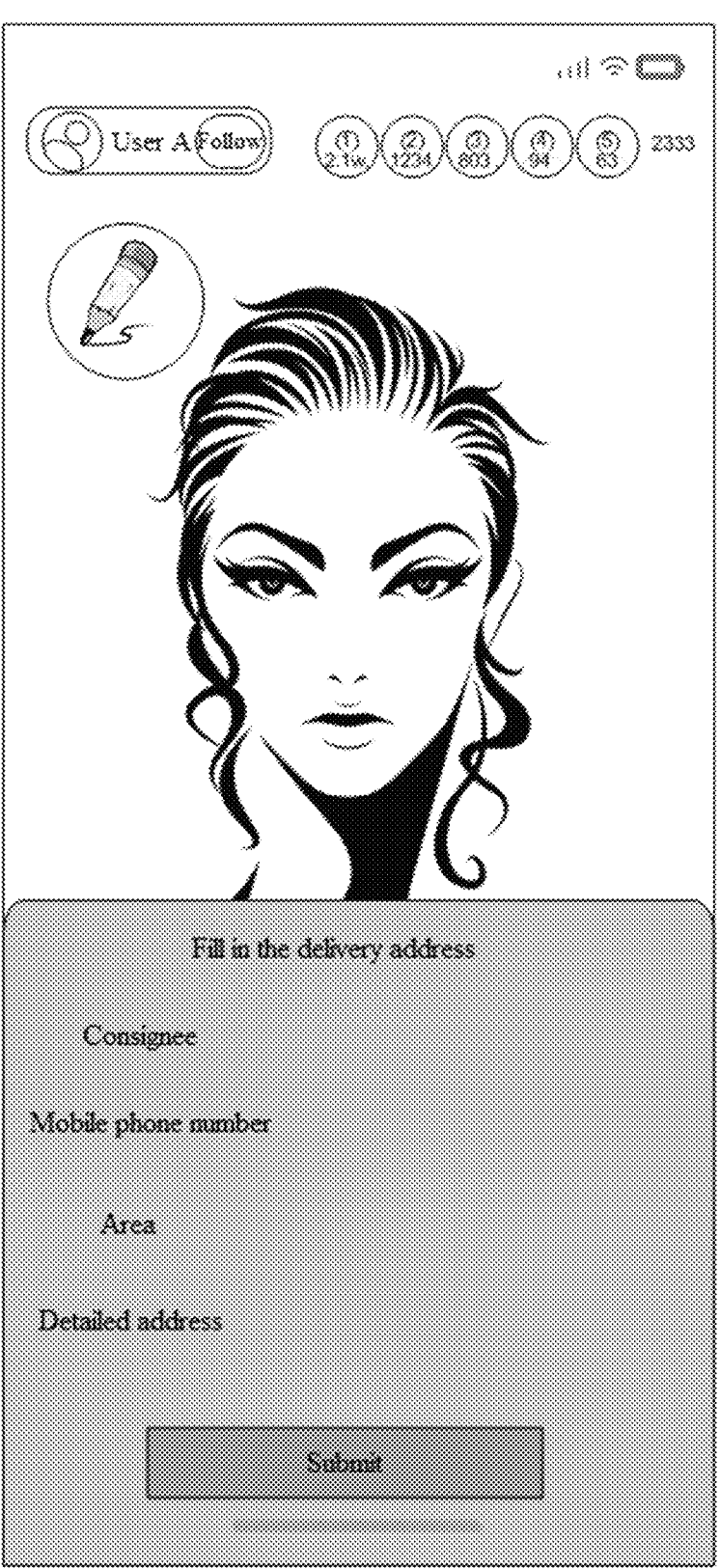
FIG. 10 is a schematic diagram of a mailing information filling page according to an embodiment of the present disclosure.

Specifically, the mailing information filling page is displayed in response to a trigger operation for the mailing information filling entry on the activity object winning prompt window. The mailing information submission control is provided on the mailing information filling page. As shown in FIG. 10, FIG. 10 is a schematic diagram of a mailing information filling page according to an embodiment of the present disclosure.

In addition, when the user completes filling of the mailing information and clicks the mailing information submission control, uploading of the mailing information is triggered, and the staff in the live streaming room may mail the activity object offline based on the mailing information.

Specifically, in response to a trigger operation for the mailing information submission control, the mailing information filled on the mailing information filling page is uploaded.

In an optional embodiment, if a message of not winning an activity object of the preset activity is received, prompt information may be displayed for the user, and a display manner of the prompt information indicating not winning the activity object is not limited here.

In an optional embodiment, the activity object winning prompt window is provided with a viewing entry for viewing a list of users winning the activity object, so that the user can view the list of users winning the activity object. As shown in FIG. 9, the activity object winning prompt window is provided with the viewing entry for viewing the list of users winning the activity object.

Figure 11:
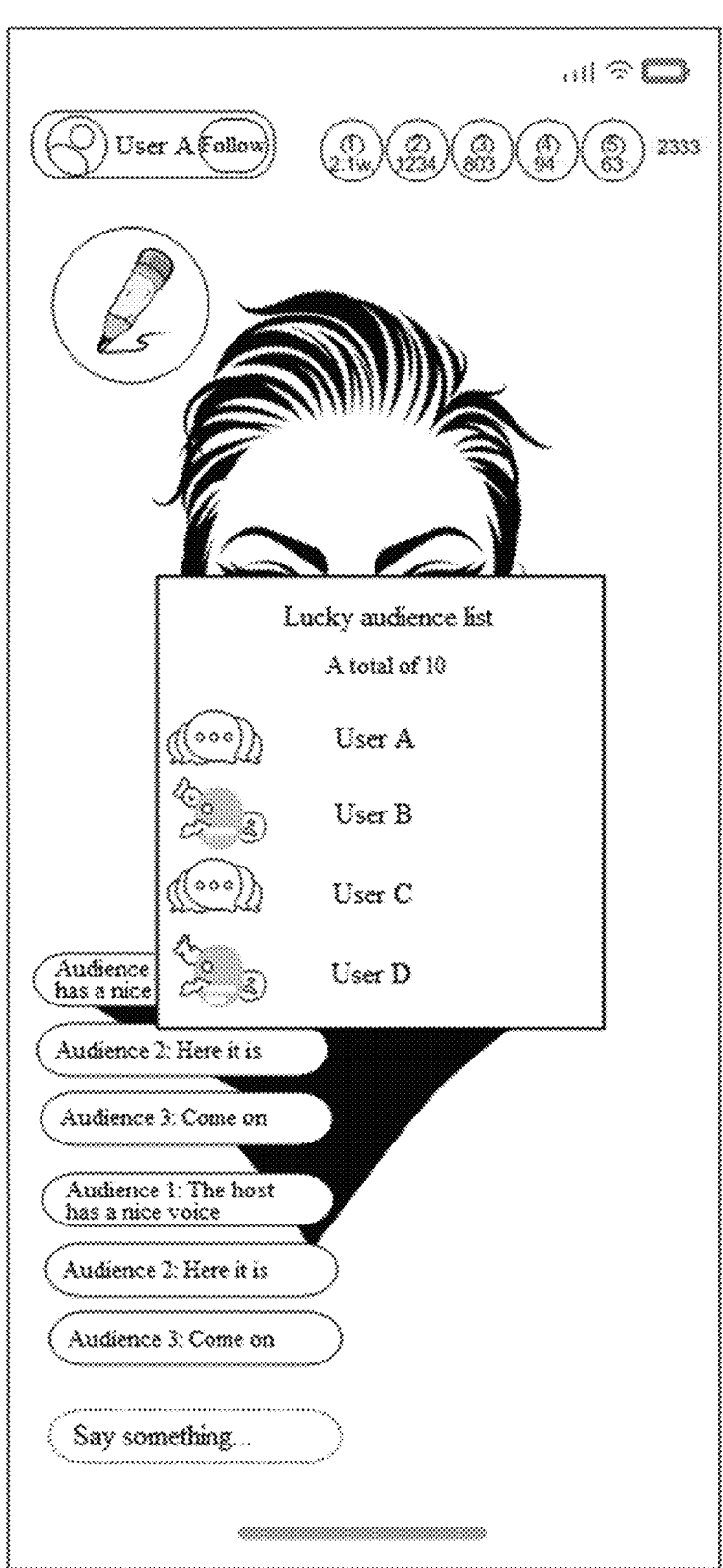
FIG. 11 is a schematic display diagram of a list of users winning the activity object according to an embodiment of the present disclosure.

When the user clicks the viewing entry on the activity object winning prompt window, the list of users winning the activity object is displayed. As shown in FIG. 11, FIG. 11 is a schematic display diagram of a list of users winning the activity object according to an embodiment of the present disclosure.

In practice, the list of users winning the activity object is displayed in response to a trigger operation for viewing entry on the activity object winning prompt window, thereby improving the authenticity of the activity and improving user experience.

In the interaction method in the live streaming room according to the embodiment of the present disclosure, participation in the activity is realized function by participating in drawing in the live streaming room, thereby enriching the interaction manners in the live streaming room and improving the user experience in the live streaming room.

Figure 12:
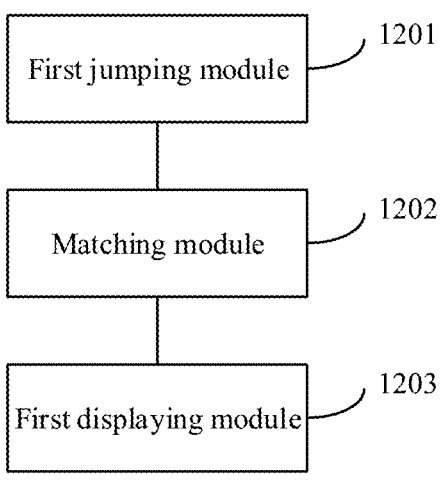
FIG. 12 is a schematic structural diagram of an interaction apparatus in a live streaming room according to an embodiment of the present disclosure.

Based on the above method embodiments, the present disclosure also provides an interaction apparatus in a live streaming room. Referring to FIG. 12, FIG. 12 is a schematic structural diagram of an interaction apparatus in a live streaming room according to an embodiment of the present disclosure. The apparatus includes: a first jumping module 1201 configured to jump, in response to a trigger operation for a preset drawing entry on a live streaming room page, from the live streaming room page to a graphic drawing page, where the graphic drawing page displays a drawing trajectory set for a preset object; a matching module 1202 configured to match, when receiving a drawing stroke on the graphic drawing page, the drawing stroke with the drawing trajectory; and a first displaying module 1203 configured to display prompt information indicating successful participation in a preset activity if it is determined that the drawing stroke is successfully matched with the drawing trajectory, where the preset activity is in a correspondence with the preset drawing entry.

In an optional embodiment, the first jumping module 1201 includes: a first displaying submodule configured to display, in response to the trigger operation for the preset drawing entry on the live streaming room page, an activity participation page of the preset activity corresponding to the preset drawing entry, where an activity participation control is provided on the activity participation page; and a first jumping submodule configured to jump, in response to a trigger operation for the activity participation control on the activity participation page, from the activity participation page to the graphic drawing page.

In an optional embodiment, the preset activity is configured with a countdown used for counting down a time period available for participation in the preset activity, the apparatus further includes a first determining module configured to determine, when receiving the drawing stroke on the graphic drawing page, whether the countdown is over; and the matching module is configured to match the drawing stroke with the drawing trajectory if it is determined that the countdown is not over.

In an optional embodiment, the apparatus further includes a second displaying module configured to display prompt information indicating failure of participating in the preset activity if it is determined that the countdown is over.

In an optional embodiment, a drawing guidance animation is played on the graphic drawing page, and the drawing guidance animation is used for guiding a user to draw based on the drawing trajectory.

In an optional embodiment, the apparatus further includes a playing module configured to play the drawing guidance animation on the graphic drawing page and display redrawing prompt information if it is determined that the drawing stroke fails to match the drawing trajectory.

In an optional embodiment, the preset activity is configured with a preset participation condition, the apparatus further includes a second determining module configured to determine, in response to the trigger operation for the preset drawing entry on the live streaming room page, whether a current user meets the preset participation condition, and the first displaying submodule is configured to display the activity participation page of the preset activity corresponding to the preset drawing entry if it is determined that the current user meets the preset participation condition.

In an optional embodiment, the apparatus further includes: a third displaying module configured to display, in response to a message of winning an activity object of the preset activity, a mailing information filling page, where a mailing information submission control is provided on the mailing information filling page; and an acquiring module configured to acquire, in response to a trigger operation for the mailing information submission control, mailing information filled on the mailing information filling page, where the mailing information is used for mailing the activity object.

In the interaction apparatus in the live streaming room according to an embodiment of the present disclosure, in response to a trigger operation for a preset drawing entry on a live streaming room page, a jump from the live streaming room page to a graphic drawing page is implemented, where the graphic drawing page displays a drawing trajectory set for a preset object. When receiving a drawing stroke on the graphic drawing page, the drawing stroke is matched with the drawing trajectory. Prompt information indicating successful participation in a preset activity is displayed if it is determined that the drawing stroke is successfully matched with the drawing trajectory, where the preset activity is in a correspondence with the preset drawing entry. In the embodiments of the present disclosure, the drawing function is provided in the live streaming room, and participation in the preset activity is triggered by the drawing stroke, thereby enriching the interaction functions in the live streaming room and improving the user experience in the live streaming room.

In addition to the above method and apparatus, a computer-readable storage medium is provided according to an embodiment of the disclosure. The computer-readable storage medium stores instructions. The instructions, when being executed in a terminal device, cause the terminal device to perform the interaction method in the live streaming room according to the embodiment of the present disclosure.

A computer program product is provided according to an embodiment of the disclosure. The computer program product includes computer programs/instructions. The computer programs/instructions, when being executed by a processor, cause the processor to perform the interaction method in the live streaming room according to the embodiment of the present disclosure.

Figure 13:
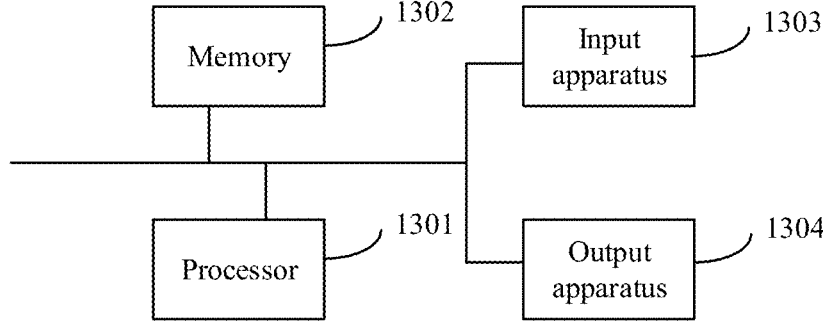
FIG. 13 is a schematic structural diagram of an interaction device in a live streaming room according to an embodiment of the present disclosure.

In addition, an interaction device in a live streaming room is provided according to an embodiment of the disclosure. As shown in FIG. 13, the device may include a processor 1301, a memory 1302, an input apparatus 1303 and an output apparatus 1304. There may be one or more processors 1301 in the interaction device in the live streaming room. One processor is taken as an example in FIG. 1313. In some embodiments of the present disclosure, the processor 1301, the memory 1302, the input apparatus 1303 and the output apparatus 1304 may be connected via a bus or in other ways, where the connection via a bus is taken as an example in FIG. 13.

The memory 1302 may be configured to store a software program and module. The processor 1301 runs the software program and module stored in the memory 1302, to perform various functional applications and data processing of the interaction device in the live streaming room. The memory 1302 may mainly include a program storage area and a data storage area. An operating system, an application program required by at least one function and the like are stored in the program storage area. Moreover, the memory 1302 may include a high-speed random access memory, and may further include a non-volatile memory, such as at least one disk storage device, a flash device or other volatile solid-state storage device. The input apparatus 1303 may be configured to receive inputted number or character information, and generate a signal input related to user settings and function control of the interaction device in the live streaming room.

In the embodiment, the processor 1301 may load an executable file corresponding to the processes of one or more application programs into the memory 1302 in response to an instruction, and the processor 1301 executes the application program stored in the memory 1302, thereby realizing various functions in interaction device in the live streaming room.

It should be noted that the relationship terms "first", "second" and the like herein are used for distinguishing an entity or operation from another entity or operation, but not intended to necessitate or imply an actual relationship or order between these entities or operations. Furthermore, terms "include", "comprise" or any other variants are intended to cover the non-exclusive inclusion. Therefore, a process, method, article or device including a series of elements is not necessarily limited to those expressly listed elements, but may include other elements not expressly listed or inherent to the process, method, article, or device. Without further limitations, an element defined by the phrase "comprising a . . . " does not exclude the presence of additional identical elements in the process, method, article or device including said element.

The above are only specific implementations of the present disclosure, such that those skilled in the art can understand or implement the present disclosure. It is obvious for those skilled in the art to make many modifications to these embodiments. The general principle defined herein may be applied to other embodiments without departing from the spirit and the scope of the present disclosure. Therefore, the present disclosure would not be limited to the embodiments described in this specification, but shall conform to the widest scope consistent with the principles and novel features disclosed herein.

The invention claimed is:

1. An interaction method in a live streaming room, comprising:
   jumping, in response to a trigger operation for a preset drawing entry on a live streaming room page, from the live streaming room page to a graphic drawing page, wherein the graphic drawing page displays a drawing trajectory set for a preset object;
   matching, when receiving a drawing stroke on the graphic drawing page, the drawing stroke with the drawing trajectory;
   displaying prompt information indicating successful participation in a preset activity, in response to determining that the drawing stroke is successfully matched with the drawing trajectory, wherein the preset activity is in a correspondence with the preset drawing entry; and
   wherein the jumping, in response to a trigger operation for a preset drawing entry on a live streaming room page, from the live streaming room page to a graphic drawing page comprises:
   displaying, in response to the trigger operation for the preset drawing entry on the live streaming room page, an activity participation page of the preset activity corresponding to the preset drawing entry, wherein an activity participation control is provided on the activity participation page; and
   jumping, in response to a trigger operation for the activity participation control on the activity participation page, from the activity participation page to the graphic drawing page.

2. The method according to claim 1, wherein the preset activity is configured with a countdown used for counting down a time period available for participation in the preset activity, and before matching the drawing stroke with the drawing trajectory, the method further comprises:
   determining, when receiving the drawing stroke on the graphic drawing page, whether the countdown is over; and
   the matching the drawing stroke with the drawing trajectory comprises:
   matching the drawing stroke with the drawing trajectory if it is determined that the countdown is not over.

3. The method according to claim 2, wherein after determining, when receiving the drawing stroke on the graphic drawing page, whether the countdown is over, the method further comprises:

displaying prompt information indicating failure of participating in the preset activity if it is determined that the countdown is over.

4. The method according to claim 1, wherein a drawing guidance animation is played on the graphic drawing page, and the drawing guidance animation is used for guiding a user to draw based on the drawing trajectory.

5. The method according to claim 4, wherein after matching the drawing stroke with the drawing trajectory, the method further comprises:

playing the drawing guidance animation on the graphic drawing page and displaying redrawing prompt information if it is determined that the drawing stroke fails to match the drawing trajectory.

6. The method according to claim 1, wherein the preset activity is configured with a preset participation condition, and before displaying the activity participation page of the preset activity corresponding to the preset drawing entry, the method further comprises:

determining, in response to the trigger operation for the preset drawing entry on the live streaming room page, whether a current user meets the preset participation condition, and the displaying an activity participation page of the preset activity corresponding to the preset drawing entry comprises:

displaying the activity participation page of the preset activity corresponding to the preset drawing entry if it is determined that the current user meets the preset participation condition.

7. The method according to claim 1, wherein after displaying the prompt information indicating successful participation in the preset activity, the method further comprises:

displaying, in response to a message of winning an activity object of the preset activity, a mailing information filling page, wherein a mailing information submission control is provided on the mailing information filling page; and acquiring, in response to a trigger operation for the mailing information submission control, mailing information filled on the mailing information filling page, wherein the mailing information is used for mailing the activity object.

8. The method according to claim 7, wherein the displaying, in response to a message of winning an activity object of the preset activity, a mailing information filling page comprises:

displaying, in response to the message of winning the activity object of the preset activity, an activity object winning prompt window on the live streaming room page; and displaying, in response to a trigger operation for the activity object winning prompt window, the mailing information filling page.

9. The method according to claim 8, wherein the activity object winning prompt window is provided with a viewing entry for viewing a list of users winning the activity object, and the method further comprises:

displaying, in response to a trigger operation for the viewing entry on the activity object winning prompt window, the list of users winning the activity object.

10. The method according to claim 1, wherein before displaying the preset drawing entry on the live streaming room page, the method further comprises:

playing an effect animation used for indicating that the activity is about to start.

11. The method according to claim 1, wherein the activity participation page is a half-screen page displayed above the live streaming room page.

12. The method according to claim 1, wherein the preset drawing entry is displayed in a form of an animation.

13. A non-transitory computer-readable storage medium storing instructions, wherein the instructions, when being executed in a terminal device, cause the terminal device to perform:

jumping, in response to a trigger operation for a preset drawing entry on a live streaming room page, from the live streaming room page to a graphic drawing page, wherein the graphic drawing page displays a drawing trajectory set for a preset object;

matching, when receiving a drawing stroke on the graphic drawing page, the drawing stroke with the drawing trajectory; and displaying prompt information indicating successful participation in a preset activity in response to determining that the drawing stroke is successfully matched with the drawing trajectory, wherein the preset activity is in a correspondence with the preset drawing entry, wherein the instructions, when being executed in a terminal device, cause the terminal device to:

display, in response to the trigger operation for the preset drawing entry on the live streaming room page, an activity participation page of the preset activity corresponding to the preset drawing entry, wherein an activity participation control is provided on the activity participation page; and jump, in response to a trigger operation for the activity participation control on the activity participation page, from the activity participation page to the graphic drawing page.

14. A device comprising a memory, a processor, and computer programs which are stored in the memory and operable on the processor, wherein the processor, when executing the computer programs, performs:

jumping, in response to a trigger operation for a preset drawing entry on a live streaming room page, from the live streaming room page to a graphic drawing page, wherein the graphic drawing page displays a drawing trajectory set for a preset object;

matching, when receiving a drawing stroke on the graphic drawing page, the drawing stroke with the drawing trajectory; and displaying prompt information indicating successful participation in a preset activity, in response to determining that the drawing stroke is successfully matched with the drawing trajectory, wherein the preset activity is in a correspondence with the preset drawing entry; and wherein the processor is further configured to perform:

displaying, in response to the trigger operation for the preset drawing entry on the live streaming room page, an activity participation page of the preset activity corresponding to the preset drawing entry, wherein an activity participation control is provided on the activity participation page; and jumping, in response to a trigger operation for the activity participation control on the activity participation page, from the activity participation page to the graphic drawing page.

15. The device according to claim 14, wherein the preset activity is configured with a countdown used for counting down a time period available for participation in the preset activity, and the processor is further configured to perform:

determining, when receiving the drawing stroke on the graphic drawing page, whether the countdown is over; and matching the drawing stroke with the drawing trajectory if it is determined that the countdown is not over.

16. The device according to claim 15, wherein the processor is further configured to perform:

displaying prompt information indicating failure of participating in the preset activity if it is determined that the countdown is over.

17. The device according to claim 14, wherein a drawing guidance animation is played on the graphic drawing page, and the drawing guidance animation is used for guiding a user to draw based on the drawing trajectory.

18. The device according to claim 17, wherein the processor is further configured to perform:

playing the drawing guidance animation on the graphic drawing page and displaying redrawing prompt information if it is determined that the drawing stroke fails to match the drawing trajectory.

19. The device according to claim 14, wherein the preset activity is configured with a preset participation condition, and the processor is further configured to perform:

determining, in response to the trigger operation for the preset drawing entry on the live streaming room page, whether a current user meets the preset participation condition, and displaying the activity participation page of the preset activity corresponding to the preset drawing entry if it is determined that the current user meets the preset participation condition.

20. The device according to claim 14, wherein, wherein the preset drawing entry is displayed in a form of an animation.

* * * * *